United States Patent [19]
Guillez

[11] Patent Number: 6,062,628
[45] Date of Patent: May 16, 2000

[54] TRUNK LID FOR CONVERTIBLE VEHICLES

[75] Inventor: Jean Marc Guillez, Cirieres, France

[73] Assignee: France Design, France

[21] Appl. No.: 09/018,458

[22] Filed: Feb. 4, 1998

[30] Foreign Application Priority Data

Feb. 5, 1997 [FR] France ................................. 97 01305

[51] Int. Cl.7 ........................................................ B60J 7/00
[52] U.S. Cl. ...................... 296/107.08; 296/76; 296/108; 49/280
[58] Field of Search ................................ 296/107.08, 76, 296/108, 107.01, 107.16, 107.17; 49/280, 229, 62, 67

[56] References Cited

U.S. PATENT DOCUMENTS

| | | | |
|---|---|---|---|
| 3,081,078 | 3/1963 | Lohr | 296/76 |
| 3,347,592 | 10/1967 | Renneker | 296/107.08 |
| 5,033,789 | 7/1991 | Hayashi et al. | 296/107.08 |
| 5,090,764 | 2/1992 | Kogawa et al. | 296/107.08 |
| 5,267,769 | 12/1993 | Bonne et al. | 296/107.08 |
| 5,655,331 | 8/1997 | Schrader et al. | 49/280 |
| 5,788,312 | 8/1998 | Lee | 49/280 |
| 5,823,606 | 10/1998 | Schenk et al. | 296/76 |
| 5,829,198 | 11/1998 | Watanabe | 49/280 |

FOREIGN PATENT DOCUMENTS

| | | |
|---|---|---|
| 4445944 | 4/1996 | Germany . |
| 2300671 | 11/1996 | United Kingdom . |

*Primary Examiner*—Joseph D. Pape
*Assistant Examiner*—Kiran Patel
*Attorney, Agent, or Firm*—Bachman & LaPointe, P.C.

[57] ABSTRACT

A trunk lid for convertible vehicles with a foldable hard top can be opened from the rear towards the front for access to the trunk or from the front towards the rear for placing and stowing the folded hard top in the trunk. The trunk lid comprises two members fastened together when the trunk lid is opened from the rear towards the front, one of these two members being dissociable from the other member so that it can be pivoted from the front towards the rear.

9 Claims, 3 Drawing Sheets

TRUNK LID FOR CONVERTIBLE VEHICLES

BACKGROUND OF THE INVENTION

Field of the Invention

The present invention concerns a trunk lid for convertible vehicles having a folding hard top and means for opening the trunk lid from the rear towards the front for access to the trunk or from the front towards the rear for placing and stowing the folded hard top in the trunk.

The aim of the present invention is to provide a trunk lid having both the above opening facilities using simple means that are easy to use.

SUMMARY OF THE INVENTION

A trunk lid in accordance with the invention for convertible vehicles having a foldable hard top and means for opening the trunk lid from the rear towards the front for access to the trunk or from the front towards the rear for placing and stowing the folded hard top in the trunk, wherein the trunk lid comprises two members fastened together for opening the trunk lid from the rear towards the front, one of the two members being dissociable from the other member to enable it to pivot from the front towards the rear, and wherein the combination of the two members being attached to the bodywork of the vehicle by an articulation at the front of the trunk lid enabling the combination to rotate from the rear towards the front and by a lock at the rear of the trunk lid for locking it to the bodywork.

Accordingly, upon normal opening of the trunk lid from the rear towards the front, the two members form an assembly which opens like a one-piece trunk lid, while otherwise, when it is required to stow the folded hard top in the trunk, one of the two members can be unlocked from the other member and then tilted from the front towards the rear to open a passage for the hard top.

Other features and advantages of the invention will become more apparent from the following description.

BRIEF DESCRIPTION OF THE DRAWINGS

In the appended drawings given by way of non-limiting example.

DETAILED DESCRIPTION OF THE PREFERRED EMBODIMENTS

Figure 1:
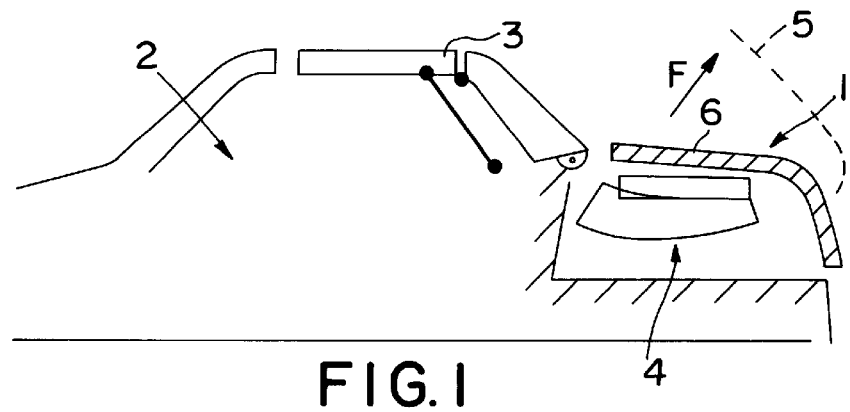
FIG. 1 is a schematic view in longitudinal section of a vehicle having a trunk lid in accordance with the invention.
Figures 2, 5, 8:
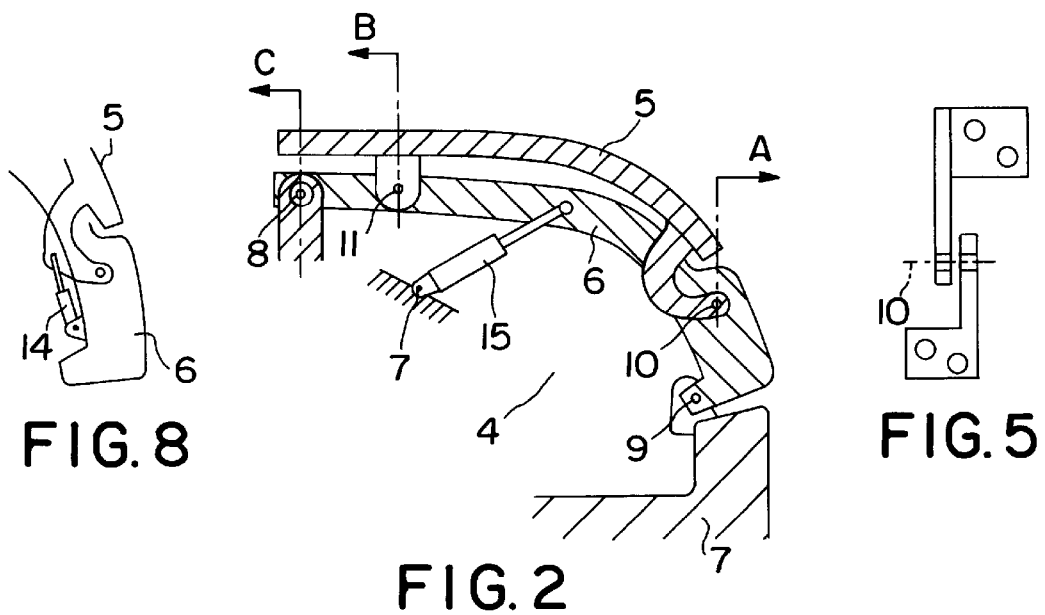
FIG. 2 is a schematic view in longitudinal section of the trunk lid in accordance with the invention.
FIG. 5 is a view in section taken along the line A in FIG. 2.
FIG. 8 is a plan view of one variant of the means of controlling pivoting of one of the trunk lid members.

In the embodiment of FIGS. 1 and 2, a convertible vehicle 2 has a foldable hard top 3 and means for opening the trunk lid 1 from the rear towards the front for access to the trunk 4 or from the front towards the rear for placing and stowing the folded hard top 3 in the trunk.

In accordance with the invention, the trunk lid 1 comprises two members 5, 6 which are fastened together when the trunk lid 1 is opened from the rear towards the front. One member 5 can be dissociated from the other member 6 to enable it to pivot from the front towards the rear (see arrow F in FIG. 1).

The combination of the two members 5, 6 is attached to the bodywork 7 of the vehicle via an articulation 8 at the front of the trunk lid 1 enabling the combination to rotate from the rear towards the front and by a lock 9 at the rear of the trunk lid 1 for locking it to the bodywork 7.

Figures 6, 7:
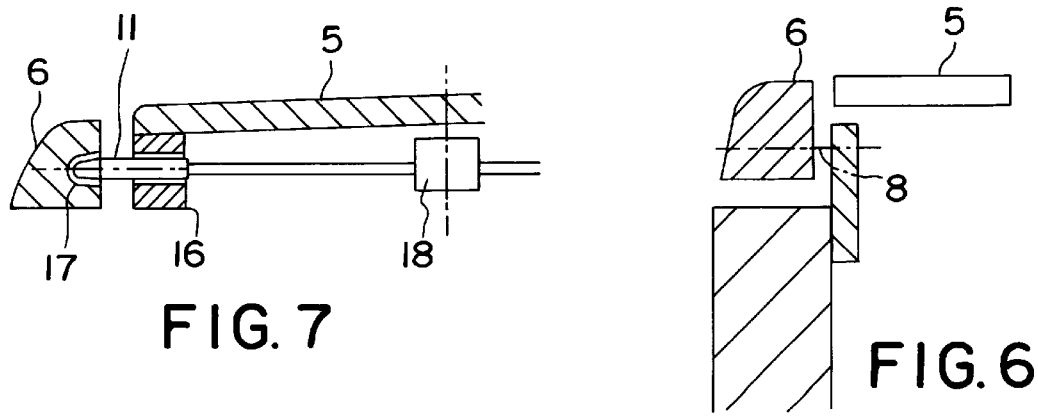
FIG. 6 is a schematic view in section taken along the line C in FIG. 2 showing the articulation of one of the trunk lid members to the bodywork of the vehicle.
FIG. 7 is a view in section taken along the line B showing the interlocking of the two members of the trunk lid.

FIG. 6 shows the articulation 8 in detail.

FIG. 2 shows that the member 5 is articulated to the second member 6 about an axis 10 near the rear of the second member and is locked to the second member 6 by a sliding latch 11 near the front of the two members 5, 6.

Figure 3:
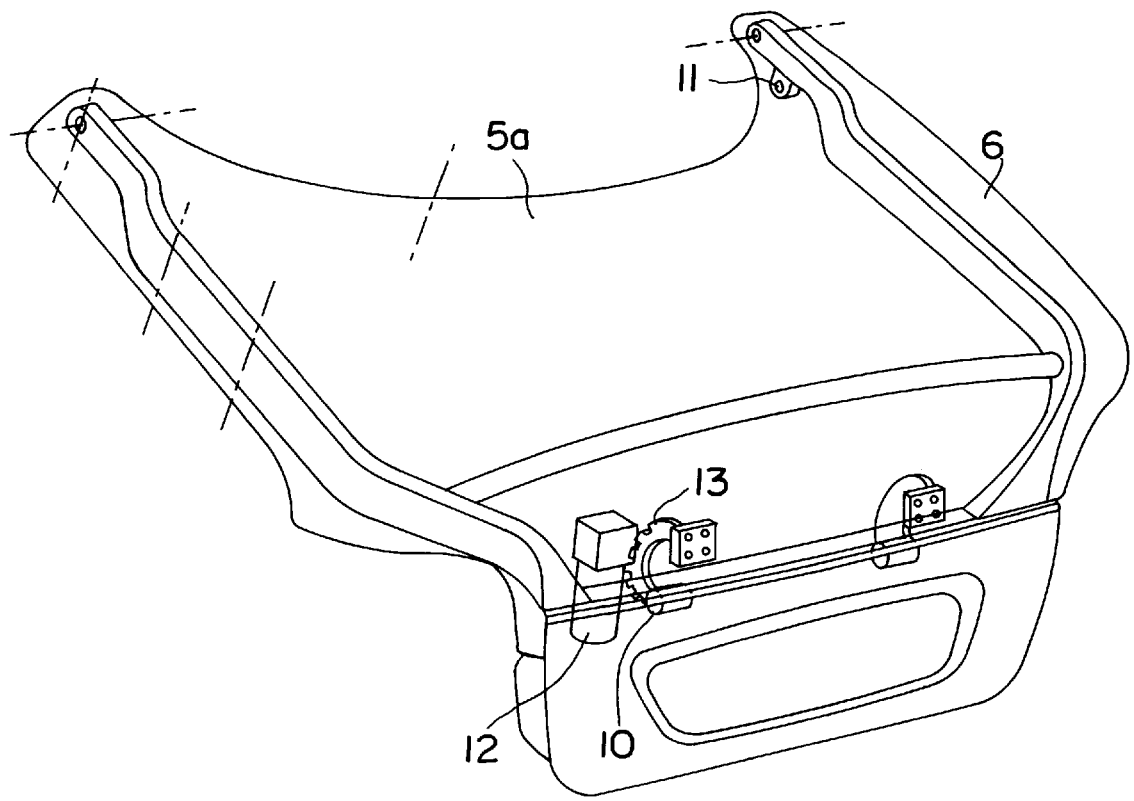
FIG. 3 is a perspective view of the trunk lid in accordance with the invention.

FIG. 3 shows that the first member 5 covers an opening 5a in the second member 6.

Figure 4:
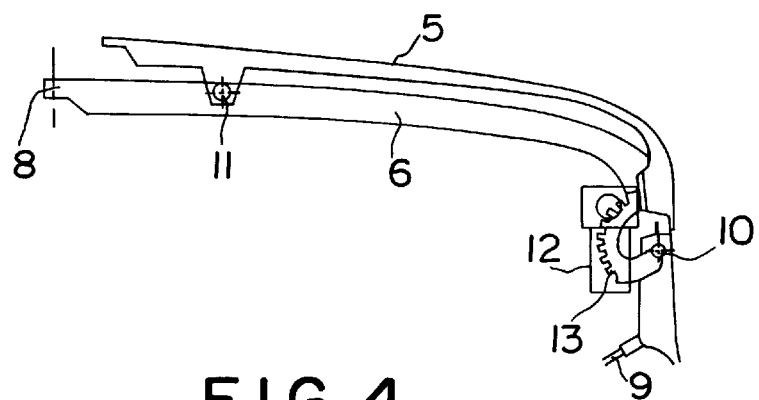
FIG. 4 is a view in longitudinal section of the trunk lid shown in FIG. 3.

The member 5 can be pivoted about the axis 10 near the rear of the other member 6 by a motor 12 driving a toothed sector 13 attached to the first member 5 (see FIG. 4).

The member 5 can equally be pivoted by a cylinder 14 (see FIG. 8) or merely counterbalanced for manual manipulation of the member 5 in which case the motor 18 is replaced by a manual lock.

The combination of the two members 5, 6 locked together by the latch 11 can be counterbalanced when it is opened from the rear towards the front by a cylinder 15 fixed to the bodywork 7 and to the member 6 (see FIG. 2).

As indicated in FIG. 7, the two members 5, 6 are locked together by a finger 11 sliding in a bearing 16 attached to the first member 5 and engaged in a hole 17 in the second member 6. The finger 11 can be operated by a motor 18 or manually.

The operation of the trunk lid just described will now be explained.

To obtain access to the trunk 4 of the vehicle the lock 9 is unlocked and the trunk lid consisting of the two members 5, 6 locked together by the latch 11 is raised.

The trunk lid therefore pivots from the rear towards the front. This movement is assisted by the cylinder 15.

When it is required to stow the hard top 3 in the trunk, the latch 11 is unlocked by operating the motor 18 or manually.

The motor 12 is then operated to pivot the member 5 from the front towards the rear to uncover the opening in the member 6.

The hard top 3 is then moved automatically or by any appropriate means towards the trunk 4, to be stowed therein in the folded state.

Of course, the invention is not limited to the examples that have just been described and many modifications can be made to the latter without departing from the scope of the invention.

Figure 9:
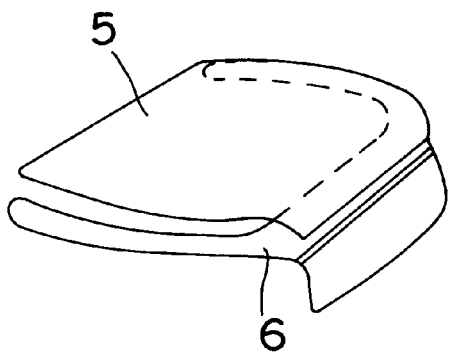
FIGS. 9, 10 and 11 show variants of the trunk lid in accordance with the invention.
Figure 10:
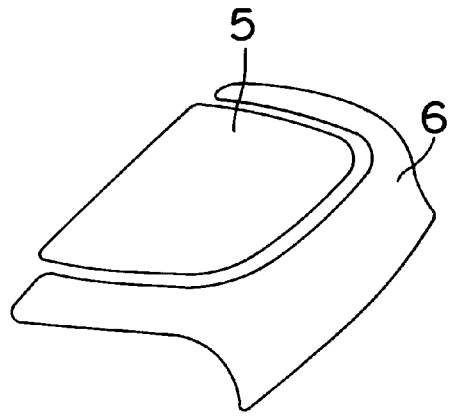
Figure 11:
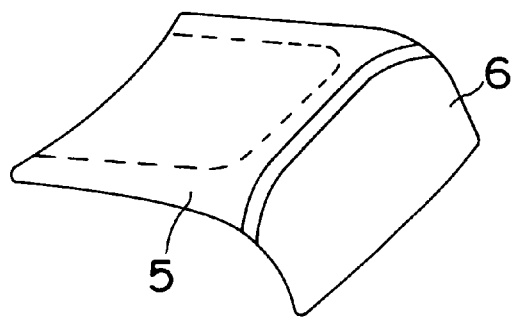

Thus the two members 5 and 6 of the trunk lid in accordance with the invention can have the configurations shown in FIGS. 9, 10 and 11.

There is claimed:

1. A convertible vehicle having a foldable hard top, bodywork, a front, a rear, a trunk, a trunk lid, and means for opening said trunk lid from the rear toward the front for gaining access to the trunk and for opening said trunk lid from the front toward the rear for placing and stowing said hard top in a folded condition in said trunk, said trunk lid comprising first and second members, said first and second members being fastened together when said trunk lid is opened from the rear toward the front, said first member being dissociable from the second member to enable said first member to pivot from the front toward the rear while said second member remains stationary, said first and second members being attached to the bodywork by an articulation located at the front of said trunk lid and by a lock at the rear of said trunk lid, and said articulation enabling said first and second members to rotate towards the front when said lock is unlocked.

2. A vehicle according to claim 1, wherein said first member is articulated to the second member about an axis near the rear of said second member and is locked to said second member by a sliding latch near the front of first and second members.

3. A vehicle according to claim 2, wherein said first member is pivoted about said axis near the rear of the second member by a motor driving a toothed sector attached to said first member.

4. A vehicle according to claim 2, wherein said first member is pivoted about said axis near the rear of the second member by a cylinder.

5. A vehicle according to claim 2, wherein said pivoting of said first member relative to said second member is counterbalanced for manual manipulation of said first member.

6. A vehicle according to claim 1, wherein said first and second members when locked together is counterbalanced upon opening from the rear towards the front by a cylinder fixed to said bodywork and to said second member.

7. A vehicle according to claim 1, wherein said first and second members are locked together by a finger sliding in a bearing attached to said first member and engaged in a hole in said second member, said finger being operated by a motor or manually.

8. A vehicle according to claim 7, wherein said finger slides in a direction perpendicular to the front and rear of said vehicle.

9. A vehicle according to claim 1, wherein said articulation is joined to a front portion of said second member.

* * * * *